US012580411B2

(12) United States Patent     (10) Patent No.:   US 12,580,411 B2

Xie          (45) Date of Patent:     Mar. 17, 2026

(54) MULTIFUNCTIONAL PORTABLE EMERGENCY POWER SUPPLY

(71) Applicant: Hu Xie, Jianshi (CN)

(72) Inventor: Hu Xie, Jianshi (CN)

( * ) Notice: Subject to any disclaimer, the term of this patent is extended or adjusted under 35 U.S.C. 154(b) by 0 days.

(21) Appl. No.: 18/793,825

(22) Filed: Aug. 4, 2024

(65) Prior Publication Data

US 2024/0396364 A1     Nov. 28, 2024

(30) Foreign Application Priority Data

Jul. 22, 2024    (CN) .......................... 202421736948.9

(51) Int. Cl.
|  |  |
|---|---|
| *F04D 25/06* | (2006.01) |
| *F04D 29/70* | (2006.01) |
| *H02J 9/00* | (2006.01) |

(52) U.S. Cl.
CPC ............ *H02J 9/00* (2013.01); *F04D 25/0673* (2013.01); *F04D 29/703* (2013.01)

(58) Field of Classification Search
CPC ....... H02J 9/00; H02J 7/0042; F04D 25/0673; F04D 29/703; F04D 25/084; F04D 25/06; F04D 29/70
USPC .......................................................... 307/23
See application file for complete search history.

(56) References Cited

U.S. PATENT DOCUMENTS

| | | |
|---|---|---|
| 2002/0079742 A1 | 6/2002 | Crosman, III et al. |
| 2003/0205939 A1 | 11/2003 | Crosman, III et al. |
| 2007/0201189 A1 | 8/2007 | Bravo et al. |
| 2024/0026846 A1* | 1/2024 | Zhang .................... H02J 1/122 |
| 2025/0215893 A1* | 7/2025 | Li ........................ A01D 34/001 |

* cited by examiner

*Primary Examiner* — Rexford N Barnie
*Assistant Examiner* — Xuan Ly
(74) *Attorney, Agent, or Firm* — Hemisphere Law, PLLC

(57) ABSTRACT

The present disclosure relates to the technical field of portable emergency power supplies related to automobiles, more particularly to a multifunctional portable emergency power supply. The multifunctional portable emergency power supply includes a power supply body. One end of the body is provided with an emergency component while another end thereof is provided with a blowing component. The emergency component is provided with an energy storage battery and an output female connector that are electrically connected to one another. The energy storage battery is configured to store electric energy. The output female connector is configured to electrically connect to an external automobile, whereby to carry out an emergency startup of the external automobile. The blowing component is provided with a high-speed fan.

7 Claims, 5 Drawing Sheets

MULTIFUNCTIONAL PORTABLE EMERGENCY POWER SUPPLY

TECHNICAL FIELD

The present disclosure relates to the technical field of portable emergency power supplies related to automobiles, more particularly to a multifunctional portable emergency power supply.

BACKGROUND

With the progress of social development, more and more people have their own automobiles. Nowadays, automobiles have become very popular, which, as a new type of transportation tool, have brought people great conveniences. Automotive technology is already very mature, in which emergency startup power supplies for automobiles have become a necessary item for automobile owners, which can be used to start up the automobiles when the startup power supplies of the automobiles are of low voltage.

On-vehicle emergency startup power supply is a multifunctional portable power supply developed for automobile enthusiasts and businesspeople who enjoy travelling by driving. Its main function is to start up an automobile when the automobile cannot be started up due to shortage of power or other reasons. However, present on-vehicle emergency startup power supplies are of a single function and are inconvenient to use.

For example, a Chinese patent with publication number of CN211377625U discloses an emergency startup power supply, including a shell, a battery and an illuminating component. The shell is formed with an illuminating window. The shell includes an inner shell and an out shell. The outer shell is a soft plastic body. The inner shell is a hard plastic body, and partial of the hard plastic body protrudes from a surface of the soft plastic body away from the corresponding hard plastic body. The battery and the illuminating component are both fixed inside the shell. The illuminating component includes a lamp bead and a lampshade. The lamp bead is fixedly installed and connected to the battery. The lampshade includes an outer wall facing the direction of the battery along the illuminating window. The outer wall is a cylindrical structure with openings on two ends thereof, and the outer wall is fixed onto the battery and covers the lamp bead.

The above emergency startup power supply has only added thereon an illuminating component, for providing an illuminating function. However, in daily usage, automobile users often need to use air guns to clean foreign objects such as dust, leaves and falling snow inside or outside the automobiles by means of high-speed airflows thereof. However, the air guns generally need to connect to air compressors for use, which are not applicable in outside scenarios.

SUMMARY

In order to address the above shortages, the present disclosure aims to provide a technical solution capable of solving the above technical problems.

The present disclosure provides a multifunctional portable emergency power supply, including a power supply body. One end of the body is provided with an emergency component while another end thereof is provided with a blowing component. The emergency component is provided with an energy storage battery and an output female connector that are electrically connected to one another. The energy storage battery is configured to store electric energy. The output female connector is configured to electrically connect to an external automobile, whereby to carry out an emergency startup of the external automobile. The blowing component is provided with a high-speed fan. The high-speed fan is electrically connected to the energy storage battery, whereby to provide operating electric energy for the high-speed fan so that the high-speed fan can operate to generate a strong airflow.

As a further solution of the present disclosure, the emergency component is further provided with a charging interface. The charging interface is electrically connected to the energy storage battery and is configured to connect the energy storage battery to an external power, whereby to charge the energy storage battery.

As a further solution of the present disclosure, the emergency component is further provided with an output interface. The output interface is electrically connected to the energy storage battery and is configured to provide output electric energy to an external device, whereby to supply power to the external device.

As a further solution of the present disclosure, the emergency component is further provided with a control circuit board and a switch button. The control circuit board is installed inside the body and is electrically connected to the switch button, the energy storage battery, the charging interface and the output interface respectively. The switch button is configured to control turn-on and turn-off of the output interface.

As a further solution of the present disclosure, the blowing component is further provided with a shift button. The shift button is electrically connected to the energy storage battery and the high-speed fan respectively and is configured to control turn-on and turn-off and an operating shift of the high-speed fan.

As a further solution of the present disclosure, the body is further provided with a holding handle. The emergency component is installed inside the holding handle, and the holding handle is matched with the energy storage battery in shape.

As a further solution of the present disclosure, the body is further provided with a blowing shell. The blowing shell is fixedly connected to one end of the holding handle and is formed as a cylindrical airflow channel with a hollow inside and openings on both two ends. The high-speed fan is installed inside the cylindrical airflow channel of the blowing shell, whereby air is blown at a high speed from one end of the blowing shell toward another end thereof to form a high-speed airflow.

As a further solution of the present disclosure, the blowing component is further provided with an air inlet duct and a blowing nozzle. The air inlet duct is installed on an air inlet end of the blowing shell to form an airflow inlet. One end of the air inlet duct abuts against the high-speed fan while another end thereof is formed with a plurality of air inlet holes, whereby air enters the high-speed fan from the air inlet holes. The blowing nozzle is formed as a funnel shape with one end having a greater diameter than another end thereof, wherein the one end with greater diameter is detachably installed on an air outlet end of the blowing shell while the one end with smaller diameter forms an airflow outlet for air to blow out at a high speed.

As a further solution of the present disclosure, the blowing component is further provided with an air guide duct. The air guide duct is installed inside the blowing shell, with one end abutting against the high-speed fan while another end thereof extending to the air outlet end of the blowing shell. The air guide duct is configured to guide an airflow blown out by the high-speed fan, so that the airflow flows toward the air outlet end of the blowing shell and avoids collision with an internal structure of the blowing shell.

As a further solution of the present disclosure, the blowing component is further provided with a protective mesh. The protective mesh is installed on the air outlet end of the blowing shell and is configured to prevent a foreign object entering the blowing shell or the air guide duct.

Compared with the prior art, the present disclosure has the following beneficial effects.

1. The power supply body are provided with the emergency component and the blowing component on two ends thereof respectively, not only to achieve an emergency startup of an external automobile by means of the energy storage battery and the output female connector, but also to blow away foreign objects such as dust, leaves and falling snow by means of a high-speed airflow blown out by the high-speed fan of the blowing component in daily lives, thereby improving life quality and enhancing convenience.

2. The power supply body can be further provided with the output interface, whereby to provide output electric energy to external devices, avoiding external small sized electronic devices such as mobile phones shutting down due to power shortage.

3. The switch button can be further provided to turn off parts that need to consume energy constantly, thus preventing loss of electric energy of the energy storage battery, prolonging the time of service of the emergency power supply, and meanwhile protecting the energy storage battery and increasing the service life thereof.

4. The air guide duct and the blowing nozzle can be further provided, so that the blowing component can blow out a high-speed airflow, improving the cleaning effect.

Therefore, through the above improvements, the present disclosure can provide a multifunctional portable emergency power supply, which not only can achieve an emergency startup of an automobile, but also can clean foreign objects by means of the blowing component, and meanwhile can enhance the convenience thereof and make itself convenient to carry and use.

Additional aspects and advantages of the present disclosure will be partially presented in the following description, some of which will become apparent from the following description or learned through practice of the present disclosure.

BRIEF DESCRIPTION OF THE DRAWINGS

For a better understanding of the technical solution in the embodiments of the present disclosure or in the prior art, accompanying drawings required to be used in the description of the embodiments or the prior art are simply illustrated below. Apparently, the accompanying drawings described below are some embodiments of the present disclosure merely. For the ordinary skill in the field, other accompanying drawings may be obtained according to these accompanying drawings without creative effort.

Figure 1:
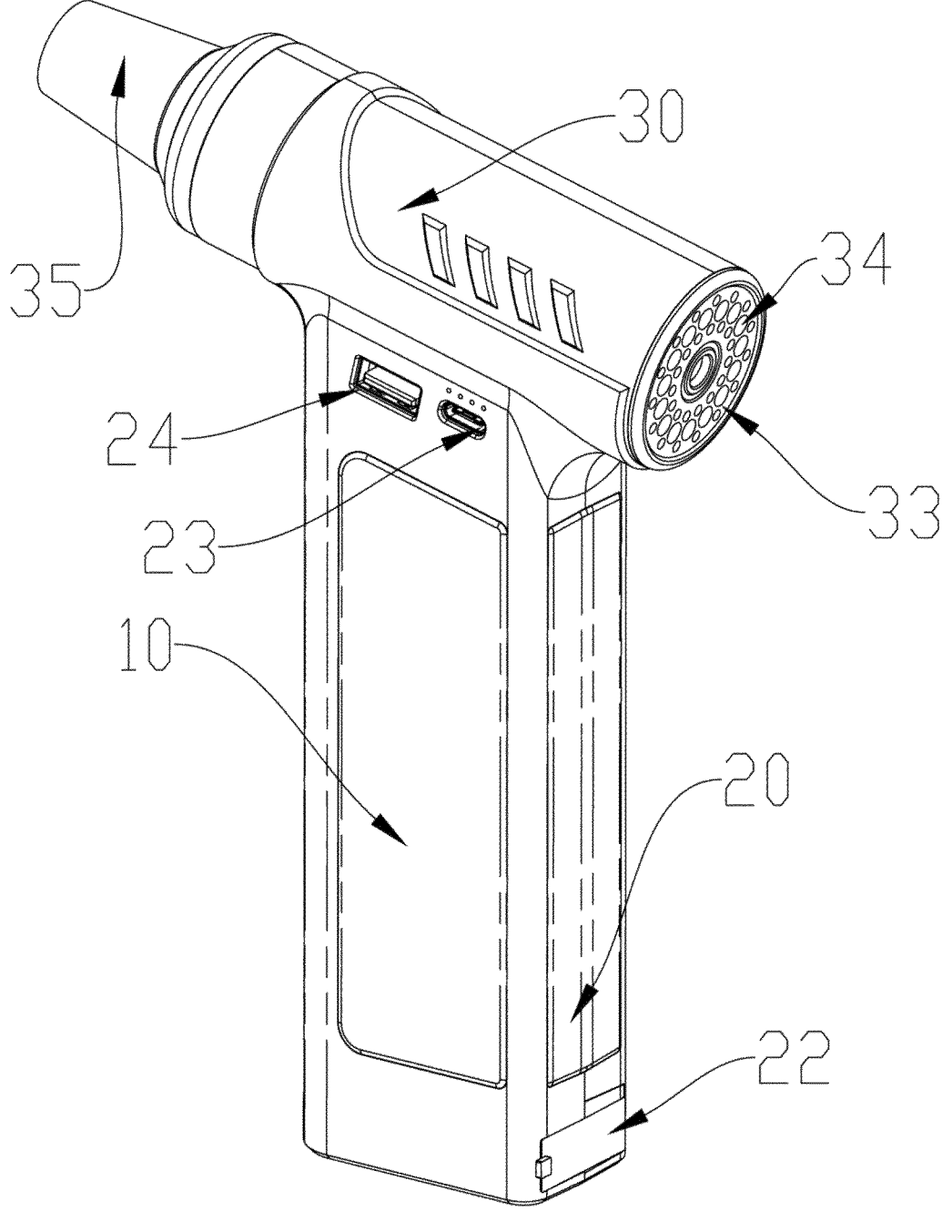
FIG. 1 is an overall structure diagram of the present disclosure.

Reference numerals and corresponding terms in the drawings are illustrated as below. 10, body; 11, holding handle; 12, blowing shell; 20, emergency component; 21, energy storage battery; 22, output female connector; 23, charging interface; 24, output interface; 25, control circuit board; 26, switch button; 30, blowing component; 31, high-speed fan; 32, shift button; 33, air inlet duct; 34, air inlet hole; 35, blowing nozzle; 36, air guide duct; and 37, protective mesh.

DETAILED DESCRIPTION OF THE EMBODIMENTS

The technical solutions of the embodiments of the present disclosure will be clearly and completely described below. Apparently, the described embodiments are merely part embodiments of the present disclosure, rather than all of the embodiments. All of the other embodiments that a person skilled in the art obtains on the basis of the embodiments of the present disclosure without paying creative work are intended to fall within the protection scope of the present disclosure.

Referring to FIG. 1 to FIG. 5, in the present embodiment, a multifunctional portable emergency power supply includes a power supply body 10. One end of the body 10 is provided with an emergency component 20 while another end thereof is provided with a blowing component 30. The emergency component 20 is provided with an energy storage battery 21 and an output female connector 22 that are electrically connected to one another. The energy storage battery 21 is configured to store electric energy. The output female connector 22 is configured to electrically connect to an external automobile, whereby to carry out an emergency startup of the external automobile. The blowing component 30 is provided with a high-speed fan 31. The high-speed fan 31 is electrically connected to the energy storage battery 21, whereby to provide operating electric energy for the high-speed fan 31, so that the high-speed fan 31 can operate to generate a strong airflow and thus form a strong blowing effect to blow away foreign objects such as dust and falling snow.

Specifically, present emergency power supplies generally are combined with illuminating functions. However, their functions are relatively single and are inconvenient for users to use. Therefore, the power supply body 10 can be provided with the emergency component 20 and the blowing component 30 on two ends thereof respectively, not only to achieve an emergency startup of an external automobile by means of the energy storage battery 21 and the output female connector 22, but also to blow away foreign objects such as dust, leaves and falling snow by means of a high-speed airflow blown out by the high-speed fan 31 of the blowing component 30 in daily lives, thereby improving life quality and enhancing convenience.

Further, the energy storage battery 21 employs a power battery preferably, which can provide a heavy current output. In addition, multiple batteries can be employed to form a battery pack, thus forming a 12V energy storage battery in combination to directly enable an emergency startup of an external automobile. Likewise, the high-speed fan 31 employs a 12V high-speed motor preferably too, which can output a high-speed airflow. For example, employing a 12V high-speed motor can achieve a rotation rate of 110000~150000, where the high-speed fan 31 can generate an extremely high-speed airflow to blow away foreign objects.

Figure 3:
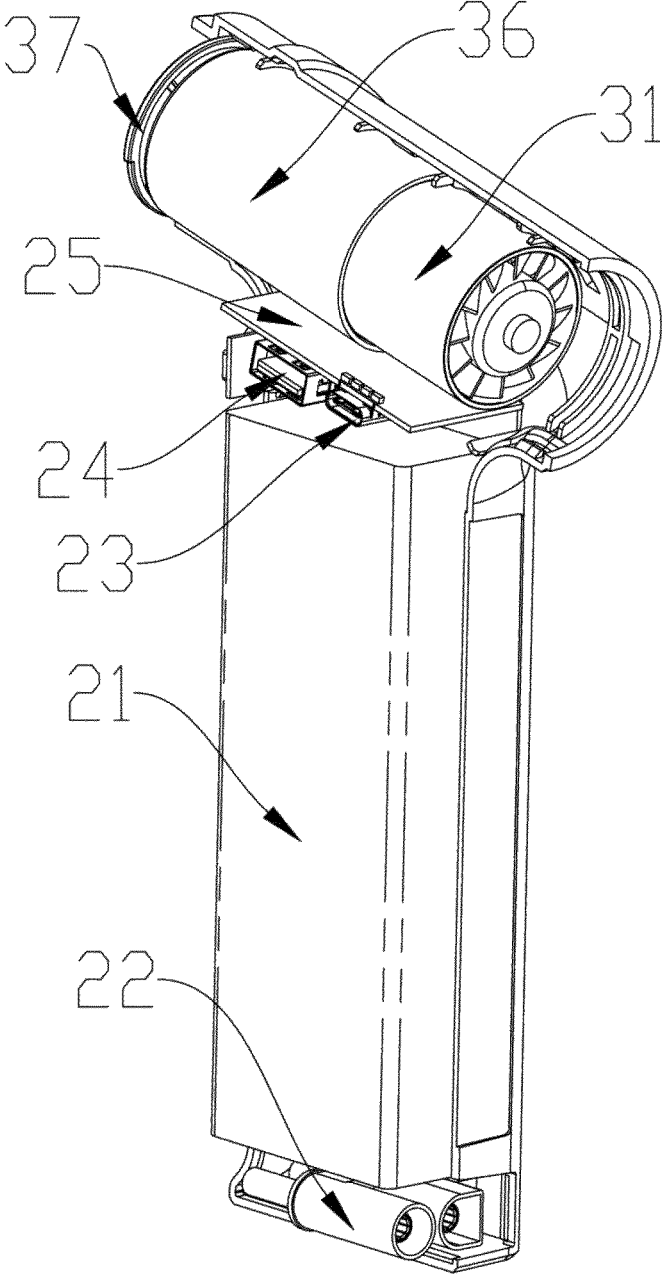
FIG. 3 is a structure diagram of an emergency component of the present disclosure.

As shown in FIG. 1 and FIG. 3, preferably, the emergency component 20 is further provided with a charging interface 23. The charging interface 23 is electrically connected to the energy storage battery 21 and is configured to connect the energy storage battery 21 to an external power, whereby to charge the energy storage battery 21. The emergency component 20 is further provided with an output interface 24. The output interface 24 is electrically connected to the energy storage battery 21 and is configured to provide output electric energy to an external device, whereby to supply power to the external device.

Specifically, the charging interface 23 can be arranged as a USB Type-C standard interface, facilitating to supplement electric energy to the emergency power supply. In addition, according to the characteristics of the USB Type-C standard interface, the charging interface 23 can be further arranged to supply power to outside. Therefore, the charging interface 23 not only can charge the energy storage battery 21, but also can output electric energy to an external device via the Type-C interface. Furthermore, the output interface 24 can be arranged as a USB Type-A standard interface, thereby supplying power to a wide range of other electronic devices.

Figure 2:
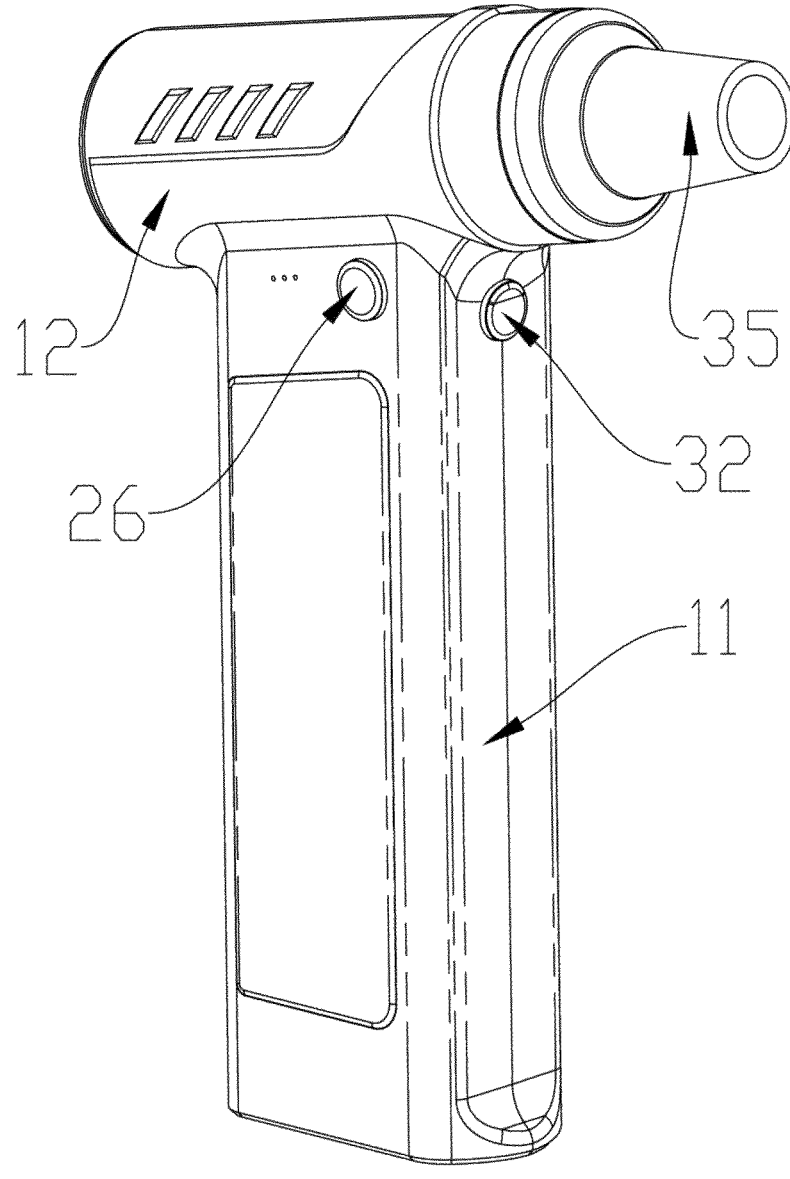
FIG. 2 is a structure diagram of a switch button of the present disclosure.

As shown in FIG. 2 and FIG. 3, preferably, the emergency component 20 is further provided with a control circuit board 25 and a switch button 26. The control circuit board 25 is installed inside the body 10 and is electrically connected to the switch button 26, the energy storage battery 21, the charging interface 23 and the output interface 24 respectively. The switch button 26 is configured to control turn-on and turn-off of the output interface 24.

Specifically, since the energy storage battery 21 outputs a 12V voltage while the USB Type-A standard interface needs to provide a 5V voltage output, it is needed to provide the control circuit board 25 so that the voltage of the energy storage battery 21 can be converted to a 5V voltage output after passing through the control circuit board 25. Just because the control circuit board 25 also has a voltage conversion function, it is easy to waste electric energy if it is kept running constantly, even exhausting the internal electric energy of the energy storage battery 21 and thus causing damages to the energy storage battery 21. Therefore, one switch button 26 can be provided to turn on or off the control circuit board 25. Meanwhile, a control chip can be provided on the control circuit board 25 too. The control chip can be employed to achieve a timed turn-off of the control circuit board 25, that is, when it is detected that the USB Type-A standard interface has not been employed to output electric energy after certain time, the control circuit board 25 is turned off autonomously. When a next use is in need, the switch button 26 can be pressed again, turning on the control circuit board 25 once again.

Further, if the USB Type-C standard interface of the charging interface 23 is also arranged to provide output electric energy to outside, the charging interface 23 can also be taken into the management scope of the control circuit board 25, so that the charging interface 23 can be turned off autonomously or be turned on or off by means of the switch button 26.

In addition, since the output female connector 22 of the emergency component 20 is directly connected to a 12V power output port of the energy storage battery 21 with no need of voltage conversion, no loss of electric energy will occur. It is not necessary to connect the output female connector 22 to the control circuit board 25, but to electrically connect to the power output port of the energy storage battery 21 directly, so that the output female connector 22 can provide a better output performance and thus provide needed current and voltage of emergency startup for the external automobile.

Figure 4:
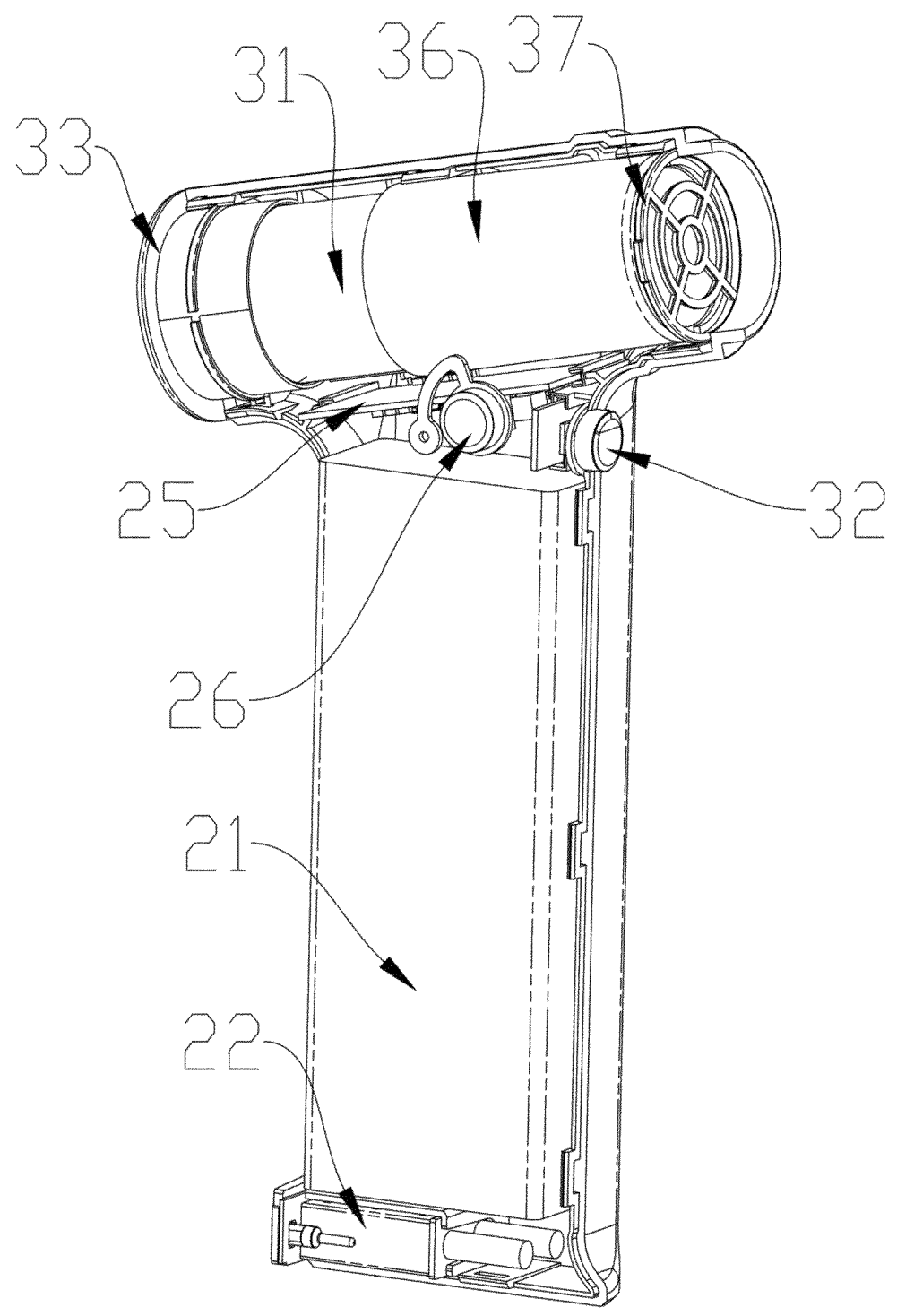
FIG. 4 is a structure diagram of a blowing component of the present disclosure.
Figure 5:
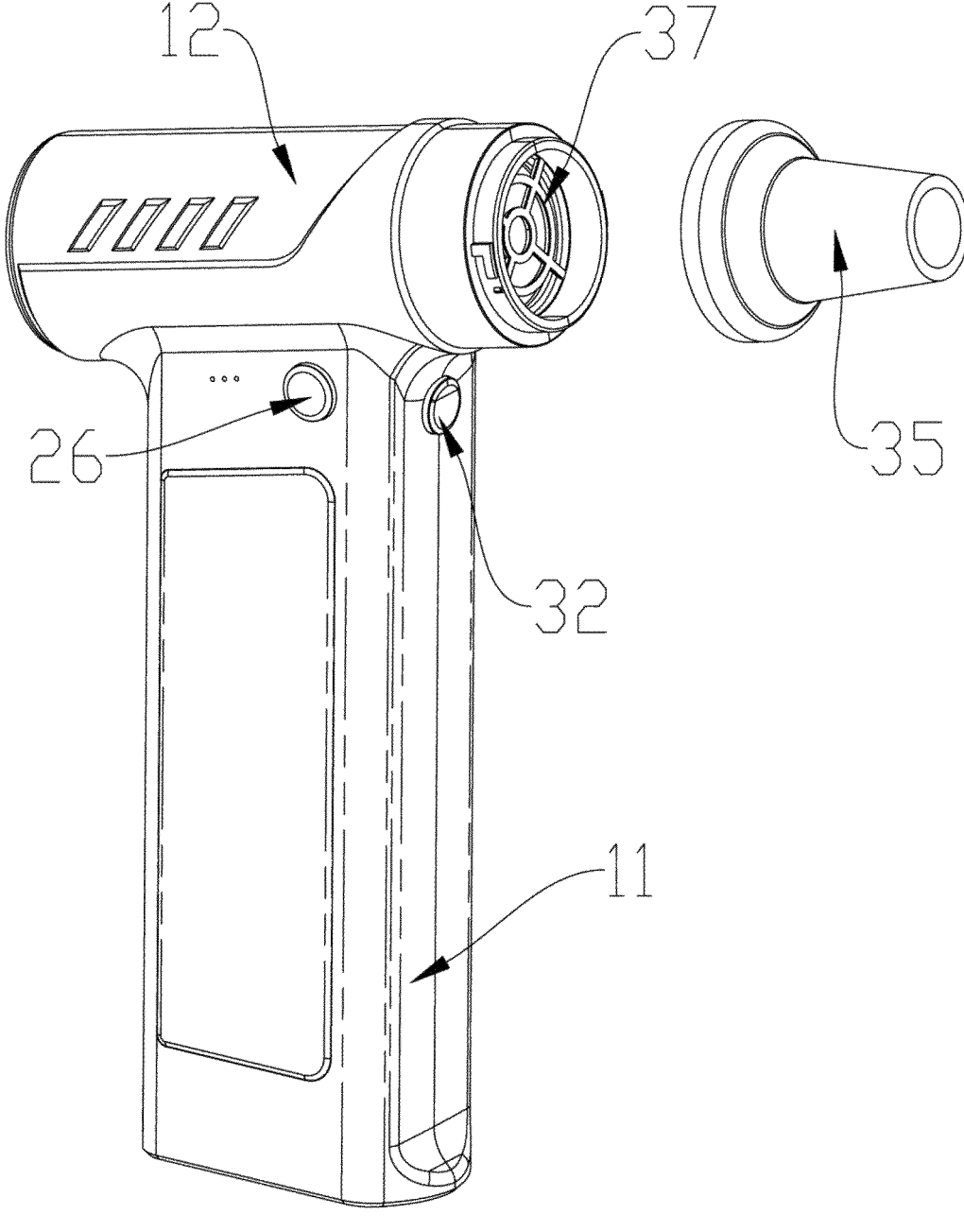
FIG. 5 is a structure diagram of a blowing nozzle in a separated state of the present disclosure.

As shown in FIG. 4 and FIG. 5, preferably, the blowing component 30 is further provided with a shift button 32. The shift button 32 is electrically connected to the energy storage battery 21 and the high-speed fan 31 respectively and is configured to control turn-on and turn-off and an operating shift of the high-speed fan 31.

Specifically, in order to broaden the scope of usage of the high-speed fan 31, the shift button 32 can be further provided. The shift button 32 is employed to control the operating shift of the high-speed fan 31, for example, a shift can be cycled between an off position, a low-speed position, a medium-speed position and a full-speed position. In addition, the shift button 32 and the high-speed fan 31 can also be electrically connected to the control circuit board 25 respectively, achieving corresponding electrical connection and control.

As shown in FIG. 2, preferably, the body 10 is further provided with a holding handle 11. The emergency component 20 is installed inside the holding handle 11, and the holding handle 11 is matched with the energy storage battery 21 in shape.

Specifically, in order to further reduce the size of the emergency power supply and improve convenience, preferably, the shape of the holding handle 11 is arranged to adapt to the shape of the energy storage battery 21. For example, if the energy storage battery 21 employs a square battery, the holding handle 11 employs a square shell too, whereby a tighter relative fit is formed with the energy storage battery 21 and the volume of the holding handle 11 can be reduced. For another example, if the energy storage battery 21 employs a cylindrical battery, the holding handle 11 can employ a cylindrical shell too, whereby a tighter relative fit is formed between the energy storage battery 21 and the cylindrical shell and the volume of the holding handle 11 is reduced.

As shown in FIG. 2 to FIG. 4, preferably, the body 10 is further provided with a blowing shell 12. The blowing shell 12 is fixedly connected to one end of the holding handle 11 and is formed as a cylindrical airflow channel with a hollow inside and openings on both two ends. The high-speed fan 31 is installed inside the cylindrical airflow channel of the blowing shell 12, whereby air is blown at a high speed from one end of the blowing shell 12 toward another end thereof to form a high-speed airflow.

Specifically, one end of the holding handle 11 can be installed with the output female connector 22 while another end thereof can be fixedly connected with the blowing component 30, that is, the blowing component 30 and the output female connector 22 are arranged on the two ends of the holding handle 11 respectively, whereby the volume of the emergency power supply can be reduced and the two ends are provided with different functions, facilitating convenient usage. In addition, the output female connector 22 employs a universal EC5 interface preferably, whereby the universality of the emergency power supply is improved and a power clip of the EC5 interface can be used to clamp an automobile's power connection column for an emergency startup.

As shown in FIG. 4 and FIG. 5, preferably, the blowing component 30 is further provided with an air inlet duct 33 and a blowing nozzle 35. The air inlet duct 33 is installed on an air inlet end of the blowing shell 12 to form an airflow inlet. One end of the air inlet duct 33 abuts against the high-speed fan 31 while another end thereof is formed with a plurality of air inlet holes 34, whereby air enters the high-speed fan 31 from the air inlet holes 34. The blowing nozzle 35 is formed as a funnel shape with one end having a greater diameter than another end thereof, wherein the one end with greater diameter is detachably installed on an air outlet end of the blowing shell 12 while the one end with smaller diameter forms an airflow outlet for air to blow out at a high speed.

Specifically, since the blowing component 30 can operate to generate a high-speed airflow, air flows into the air inlet duct 33 from one end of the air inlet duct 33 at a high speed too. Therefore, a corresponding mesh structure can be provided on one air inlet end of the air inlet duct 33, that is, forming a plurality of air inlet holes 34, where air can normally enter via the air inlet holes 34 while other objects can be prevented from entering inside the air inlet duct 33, thus avoiding foreign objects damaging the high-speed fan 31.

Further, the blowing nozzle 35 can be installed on the blowing shell 12 employing a snap-fit connection, so that it can be detached and replaced. For example, many other shapes of blowing nozzles 35 can be further provided so that they can be replaced and installed on the blowing shell 12, achieving different blowing functions. For example, a blowing nozzle 35 with an air inlet end having a smaller diameter than an air outlet end is provided, which, after being installed on the blowing shell 12, can decelerate the high-speed airflow blown out by the high-speed fan 31, making the airflow relatively gentle and thus being available for users to blow their hair, etc.

As shown in FIG. 3 and FIG. 4, preferably, the blowing component 30 is further provided with an air guide duct 36. The air guide duct 36 is installed inside the blowing shell 12, with one end abutting against the high-speed fan 31 while another end thereof extending to the air outlet end of the blowing shell 12. The air guide duct 36 is configured to guide an airflow blown out by the high-speed fan 31, so that the airflow flows toward the air outlet end of the blowing shell 12 and avoids collision with an internal structure of the blowing shell 12. The blowing component 30 is further provided with a protective mesh 37. The protective mesh 37 is installed on the air outlet end of the blowing shell 12 and is configured to prevent a foreign object entering the blowing shell 12 or the air guide duct 36.

Specifically, since the blowing shell 12 is provided with some reinforcement ribs on an inner wall thereof, if the high-speed airflow directly flows inside the blowing shell 12, it is easy to cause the high-speed airflow colliding with the reinforcement ribs, thus forming big noises and impacting the flowing speed of the high-speed airflow. Therefore, an air guide duct 36 with a smooth inner wall may be provided, which is configured to guide the high-speed airflow to blow out at a high speed. Furthermore, since the blowing nozzle 35 can be replaced, the protective mesh 37 can be provided on the air outlet end of the blowing shell 12, preventing foreign objects entering inside the air guide duct 36 to impact the normal operation of the blowing component 30.

For those skilled in the art, obviously, the present disclosure is not limited to the details of the above exemplary embodiments, and the present disclosure may be realized by other specific forms without departing from the spirit or basic features of the present disclosure. Therefore, no matter from which point, the embodiments should be viewed as exemplary, but restrictive; the scope of the present disclosure is limited by claims appended herein but by the description above; therefore, all changes falling within the implication and scope of equivalent elements of the claims are intended to be included in the present disclosure.

What is claimed is:

1. A multifunctional portable emergency power supply, comprising a power supply body, wherein one end of the power supply body is provided with an emergency component while another end thereof is provided with a blowing component, the emergency component is provided with an energy storage battery and an output female connector that are electrically connected to one another, the blowing component is provided with a high-speed fan, and the high-speed fan is electrically connected to the energy storage battery, whereby to provide operating electric energy for the high-speed fan (31) so that the high-speed fan can operate to generate a strong airflow;

wherein the body is further provided with a holding handle, the emergency component is installed inside the holding handle, and the holding handle is matched with the energy storage battery in shape; the body is further provided with a blowing shell, the blowing shell is fixedly connected to one end of the holding handle and is formed as a cylindrical airflow channel with a hollow inside and openings on both two ends, and the high-speed fan is installed inside the cylindrical airflow channel of the blowing shell, whereby air is blown at a high speed from one end of the blowing shell toward another end thereof to form a high-speed airflow; the blowing component is further provided with an air inlet duct and a blowing nozzle, the air inlet duct is installed on an air inlet end of the blowing shell to form an airflow inlet, one end of the air inlet duct abuts against the high-speed fan while another end thereof is formed with a plurality of air inlet holes, whereby air enters the high-speed fan from the air inlet holes, and the blowing nozzle is formed as a funnel shape with one end having a greater diameter than another end thereof, wherein the one end with greater diameter is detachably installed on an air outlet end of the blowing shell while the one end with smaller diameter forms an airflow outlet for air to blow out at a high speed.

2. The multifunctional portable emergency power supply according to claim 1, wherein the emergency component is further provided with a charging interface, and the charging interface is electrically connected to the energy storage battery and is configured to connect the energy storage battery—to an external power, whereby to charge the energy storage battery.

3. The multifunctional portable emergency power supply according to claim 2, wherein the emergency component is further provided with an output interface, and the output interface is electrically connected to the energy storage battery and is configured to provide output electric energy to an external device, whereby to supply power to the external device.

4. The multifunctional portable emergency power supply according to claim 3, wherein the emergency component is further provided with a control circuit board and a switch button, the control circuit board is installed inside the body and is electrically connected to the switch button, the energy storage battery, the charging interface and the output interface—respectively, and the switch button is configured to control turn-on and turn-off of the output interface.

5. The multifunctional portable emergency power supply according to claim 1, wherein the blowing component is further provided with a shift button, and the shift button is electrically connected to the energy storage battery and the high-speed fan respectively and is configured to control turn-on and turn-off and an operating shift of the high-speed fan.

6. The multifunctional portable emergency power supply according to claim 1, wherein the blowing component is further provided with an air guide duct, the air guide duct is installed inside the blowing shell with one end abutting against the high-speed fan while another end thereof extending to the air outlet end of the blowing shell, and the air guide duct is configured to guide an airflow blown out by the high-speed fan, so that the airflow flows toward the air outlet end of the blowing shell and avoids collision with an internal structure of the blowing shell.

7. The multifunctional portable emergency power supply according to claim 6, wherein the blowing component is further provided with a protective mesh, and the protective mesh is installed on the air outlet end of the blowing shell and is configured to prevent a foreign object entering the blowing shell or the air guide duct.

\* \* \* \* \*